Jan. 13, 1953
G. T. SMITH
2,625,256
CONVEYER BELT CONTROL
Filed March 28, 1949
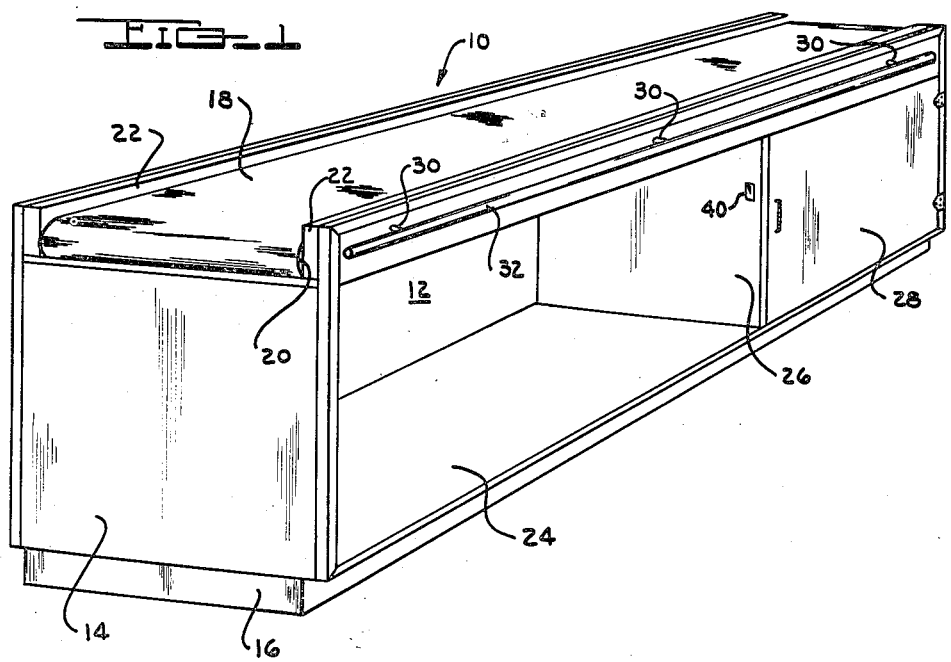
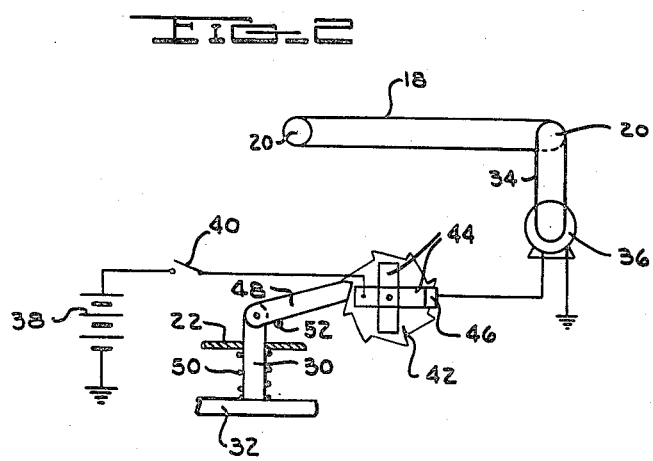
INVENTOR.
GEORGE T. SMITH
BY
*Arthur M. Smith*
ATTORNEY

UNITED STATES PATENT OFFICE 2,625,256

CONVEYER BELT CONTROL

George T. Smith, Lansing, Mich., assignor to George T. Smith, Inc., Lansing, Mich., a corporation of Michigan Application March 28, 1949, Serial No. 83,837

2 Claims. (Cl. 198—203)

This invention relates to a counter and more particularly to a counter having its top surface provided with a movable conveyor belt, primarily for use in a checking out system such as disclosed in my co-pending application Serial No. 83,838, filed March 28, 1949.

In the above-identified application a system for checking out merchandise in a market of the self-serve type is disclosed, in which the purchaser places articles selected, as a group, on a conveyor to be sorted, checked, and priced. The goods are continuously fed past operators who perform the necessary operations.

The present invention relates specifically to the counter, the conveyor belt and controls therefor.

It is an important object of the present invention to provide a counter having a movable conveyor extending longitudinally of the counter and to provide a longitudinally extending rail which serves as a switch for controlling the speed of the belt so that the movement of the conveyor may be selectively stopped or started at will by bodily contact of the operator with the side rail.

Other objects and advantages of the invention will more fully appear from the following description taken in connection with the accompanying drawings in which:

Fig. 1 is a perspective view of the counter; and

Fig. 2 is a diagrammatic view illustrating the control for the movable conveyor belt.

Referring to the drawings, I have shown a counter 10 having a front face 12, end wall 14 and base 16. The upper surface of the counter is provided with a continuous belt 18 which surrounds pulleys 20. The longitudinal side walls 22 of the counter are extended vertically above the upper surface of the conveyor belt to serve as guides for preventing lateral displacement of goods on the conveyor.

The major portion of the back of the counter is open to provide a storage space on the floor 24. A compartment 26, having a door 28, is provided to enclose the driving mechanism for the conveyor belt, diagrammatically shown in Fig. 2.

Slidably mounted in the side wall 22 and in close proximity to the top of the counter are laterally projecting rods 30 which carry a longitudinally extending rail 32 outwardly projecting from the rear face. This rail extends substantially the full length of the counter.

Referring to Fig. 2, I have shown one of the pulleys 20 driven by a belt 34 which in turn is driven by an electric motor 36. Electric current is supplied through a source of energy 38. A manually controlled switch 40 is provided in the circuit for disconnecting the power line from the motor. As an additional circuit interrupter, I have provided a rotatable toothed member 42 such as a ratchet wheel carrying contact fingers 44 diametrically arranged at right angles to each other and arranged for contacting oppositely disposed terminals 46.

The rods 30 are provided with interconnected arms 48 in engagement with one of the projections of the ratchet wheel 42. Compression springs 50 normally urge the rail outwardly. A stop 52 is provided to locate the outward position of the arms 48.

In the operation of the device the conveyor belt is started by turning the switch 40 to the "on" position, provided the ratchet wheel 42 is in a position so that the contact fingers 44 make contact with the terminals 46. If not, the rail is pressed, rotating the ratchet wheel 42 forty-five degrees, to position the contact fingers between the terminals. This starts the electric motor and the conveyor belt travels longitudinally of the counter.

If it is desired to stop the conveyor, the operator can do so at any position along the counter by merely pressing the body against the rail at any point along the rail, without going to and manipulating the manually controlled switch 40. Thus, the conveyor is controlled at will and may be selectively stopped or started. This permits a single operator to quickly control the movement of the conveyor, depending upon the time required to perform the required operation, and regardless of the operator's location along the length of the counter.

It will be understood that various changes including the size, shape and arrangement of parts may be made without departing from the spirit of my invention and it is not my intention to limit its scope other than by the terms of the appended claims.

Having thus described my invention, I claim:

1. A counter comprising, a body portion of materially greater longitudinal dimension than transverse dimension having a movable conveyor belt forming its upper surface, side walls extending longitudinally of said body portion and extending vertically above the upper surface of said conveyor belt, an electric motor for driving said belt, a switch for controlling said motor, and a movably mounted rail extending substantially along the full length of said counter for actuating said switch to start or stop said motor.

2. A counter comprising, a body portion of materially greater longitudinal dimension than transverse dimension having a movable conveyor belt forming its upper surface, side walls extending longitudinally of said body portion and extending vertically above the upper surface of said conveyor belt, an electric motor for driving said belt, a switch for controlling said motor, and a movably mounted rail extending substantially along the full length of said counter for actuating said switch to start or stop said motor, said rail being located adjacent and extending outwardly from the upper surface of said counter.

GEORGE T. SMITH.

REFERENCES CITED

The following references are of record in the file of this patent:

UNITED STATES PATENTS

| Number | Name | Date |
|---|---|---|
| 1,460,332 | Tripp, Jr. | June 26, 1923 |
| 2,237,080 | Muse | April 1, 1941 |
| 2,298,781 | Bluemle | Oct. 13, 1942 |
| 2,495,249 | Gilbert | Jan. 24, 1950 |